(No Model.)
G. W. MORRIS.
THRASHING MACHINE.
No. 354,803. Patented Dec. 21, 1886.
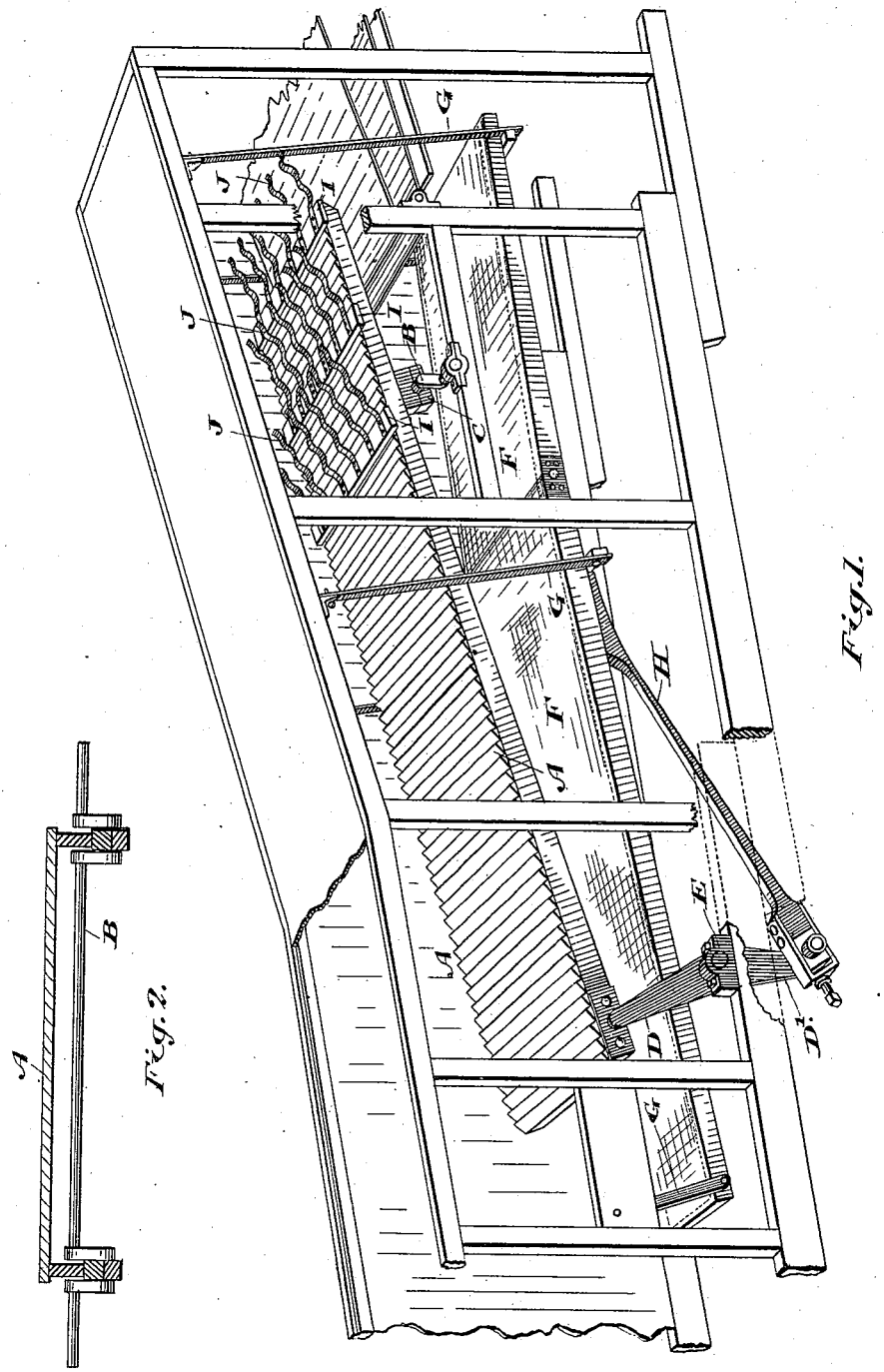

UNITED STATES PATENT OFFICE.

GEORGE W. MORRIS, OF BRANTFORD, ONTARIO, CANADA.

THRASHING-MACHINE.

SPECIFICATION forming part of Letters Patent No. 354,803, dated December 21, 1886.

Application filed June 17, 1886. Serial No. 205,448. (No model.)

*To all whom it may concern:*

Be it known that I, GEORGE WILLIAM MORRIS, of the city of Brantford, in the county of Brant, in the Province of Ontario, Canada, manufacturer, have invented certain new and useful Improvements in Thrashing-Machines, of which the following is a specification.

This invention relates to thrashing-machines; and it consists in the peculiar combination and the novel construction and arrangement of parts, all as more fully hereinafter described and claimed.

Figure 1 is a perspective view showing the straw-carrier and grain-board of a thrashing-machine, and sufficient of the latter's frame to illustrate the means by which the straw-carrier and grain-board are supported by the said frames. Fig. 2 is a detail, partly in section, showing the connection between the crank-shaft and straw-carrier.

A represents the straw-carrier, consisting of a series of cross-slats supported by longitudinal side pieces arranged in the ordinary way. One end of the straw-carrier A is supported on the crank-shaft B, being provided with suitable bearing-boxes, C, for that purpose. The other end of the straw-carrier is supported on the upper end of the rocker-arm D, which is pivoted or journaled in the journal-boxes E, supported on the main frame of the machine, as indicated.

F is the grain-board, supported below the straw-carrier by a series of spring-hangers, G. A pitman, H, is connected at one end to the grain-board F, and at the other end is journaled on the lower end, D', of the rocker-arm D.

When the crank-shaft B revolves, the straw-carrier A derives a longitudinal reciprocating motion, the end supported by the crank-shaft receiving also a vertical reciprocating motion.

As the rocker-arm D is connected at one end to the straw-carrier A, and at its other end, D', through the pitman H, to the grain-board F, the rocking movement imparted to it by the reciprocating motion of the straw-carrier A is conveyed through its lower arm, D', to the grain-board F, the said board and carrier, however, moving in opposite directions to each other, and as the upper portion of the rocker-arm D is longer than its lower portion, D', the travel of the grain-board F is not so great as that of the straw-carrier A.

I are bars, preferably of wood, secured to the top of the straw-carrier A, as shown. From these bars project, substantially at the angle shown, a series of spring-fingers, J, made of flat, round, or any other shaped spring-steel, sufficiently thin to be easily vibrated, and bent substantially in the form shown, so that their vibrations shall the better shake the straw. These spring-fingers should be connected to the bars I, so that they may be readily detached and replaced separately.

Any number of spring-fingers in a row may be used, and any number of rows may be arranged; but in practice I find that three rows of these fingers, and five in a row, for what is known as a "forty-eight-inch machine," is ample, and such a machine provided with these bent spring-fingers will not waste any grain, but will effectually separate the same from the straw; but no claim is made to these fingers, as they are not new with me.

What I claim as my invention is—

The combination, with the straw-carrier and the main frame, of the boxes C, secured to said carrier, the crank-shaft B, journaled in said boxes and supporting one end of said carrier-boxes E on said main frame, rocker-arm D, journaled in said boxes, with one arm connected with the carrier, the grain-board F, supported below the straw-carrier, the spring-hangers, and the pitman H, connecting said grain-board and rocker-arm, substantially as and for the purpose specified.

Brantford, June 8, 1886.

GEORGE W. MORRIS.

In presence of—
T. S. THURSTON,
JOHN FOULDE.